United States Patent Office 2,736,893
Patented Feb. 28, 1956

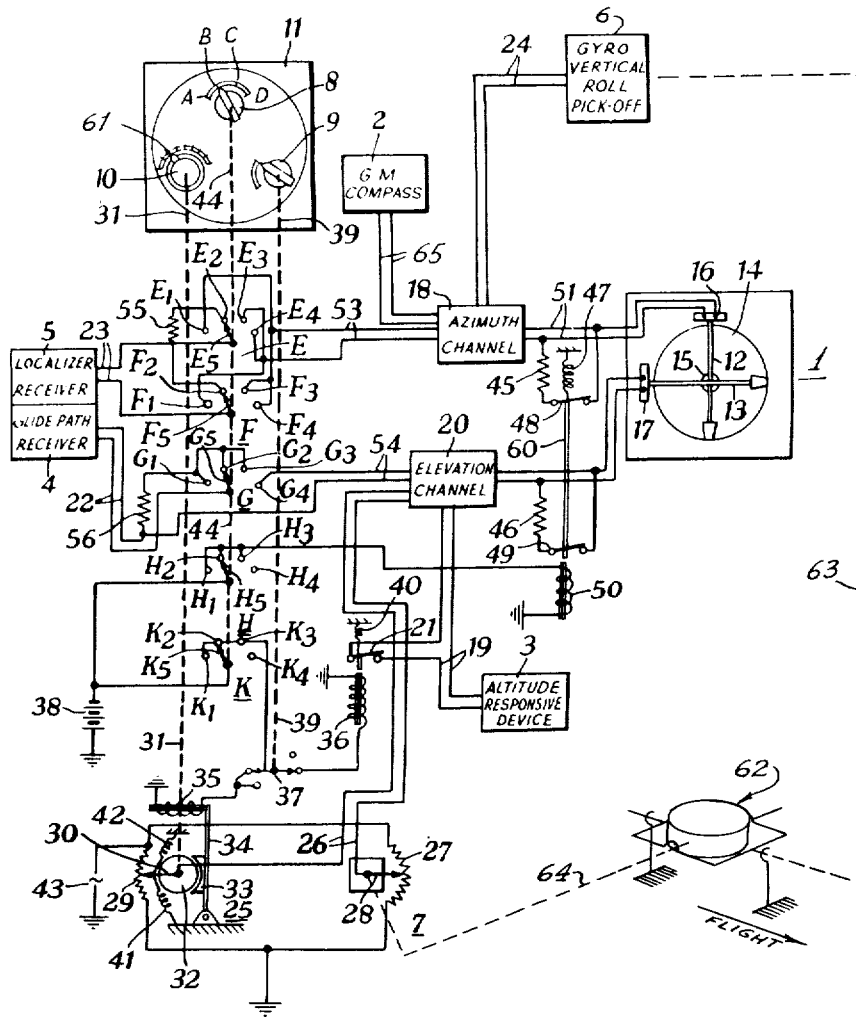

2,736,893

CRAFT GUIDANCE APPARATUS

Gert Sidney Zoege von Manteuffel, Wraysbury, and Colin Arthur Richardson, Ham Common, England, assignors, by mesne assignments, to The Sperry Gyroscope Company, Limited, Brentford, England, a British company Application July 19, 1951, Serial No. 237,576

Claims priority, application Great Britain July 27, 1950

13 Claims. (Cl. 343—108)

This invention relates to apparatus for use in aircraft for facilitating the steering of the aircraft and, in particular, in steering the aircraft in a vertical plane.

One feature of the invention relates to apparatus employing a pitch-responsive means capable of providing a signal dependent upon departure of the aircraft from a prescribed angle of pitch, an altitude-responsive means capable of providing a signal dependent upon departure of the aircraft from a prescribed altitude, and a resultant signal device to which one or both of said pitch and altitude signals may be applied to constitute a component of a resultant signal by means of which the steering of the craft in the vertical plane may be controlled.

In accordance with this feature of the invention there is provided apparatus for use in aircraft for facilitating the steering of the aircraft in a vertical plane comprising pitch-responsive means for providing a signal measuring departure of the aircraft from a predetermined pitch inclination, pitch-setting means or the like for setting the predetermined pitch, altitude-responsive means for providing a signal measuring departure of the aircraft from a predetermined altitude, altitude-setting means or the like for setting the predetermined altitude, indicating or control means in which is produced a resultant signal in accordance with which the craft is to be steered, means for supplying the pitch-deviation signal to form the resultant signal or a component thereof and switch means for supplying, at will, the altitude-deviation signal to form a second component of the said signal whereby the aircraft may be steered alternatively to keep the pitch signal constant or to keep the altitude-deviation signal substantially zero. The effect of the pitch-deviation component signal when combined with the altitude-deviation signal is to ensure that oscillatory movements of the aircraft in the vertical plane are damped. According to this feature of the invention there is also provided means operative to ensure that, whenever the altitude-deviation signal has been switched into operation and subsequently switched out of operation, any pitch set by means of the pitch-setting means prior to the switching into operation of the altitude-deviation signal shall be reduced to zero or to a small angle corresponding to a desired trim of the aircraft, during the period following the switching of the altitude-deviation signal out of operation, unless, and until such time as, it may subsequently be readjusted as may be desired from the zero or small angle setting produced by the said zeroising means.

The altitude-setting means may comprise merely means for rendering the altitude-responsive means operative to provide a signal measuring deviation of the altitude of the aircraft from the altitude obtaining at the instant at which the altitude-setting means is rendered operative whereby the latter altitude is set as the predetermining altitude, deviations from which are to be measured.

Another feature of the invention is concerned with apparatus employing indicating means for providing visual indication to the pilot by means of which he may accomplish manual steering of the aircraft, such indicating means being controlled, at least in part, from a direction-responsive device, such as a gyro-horizon or a directional gyroscope monitored by a device responsive to the earth's magnetic field, providing information concerning the aircraft's attitude about one of its axes.

Normally such indicating means provides an indication to the pilot of the angular departure of the aircraft from a desired heading or attitude which may be predetermined and set or may be computed by a computer as being the heading or attitude that the aircraft should assume in order accurately to carry out a predetermined flight operation, such as a bombing run or an airfield approach along a radio-defined landing path.

It is usually the case that the same indicating means is used to provide indications to the pilot to assist him in steering the aircraft to carry out different flight operations. For example, the same indicator may be used to show angular deviations of the aircraft in pitch from a level position during cross-country flight or, during an airfield approach, from a computed pitch angle defined for it in part by a landing beam receiver that measures the aircraft's vertical departure from a radio-defined landing path and computes the computed pitch angle in dependence thereon.

The present feature of the invention aims at improving indicating systems of this kind in which the same indicating means is used in a plurality of flight operations and has as an object to ensure that in different flight operations the indicating means is given the best sensitivity for that flight operation.

Some flight operations call for greater accuracy of control by the pilot than others. For example, during a bombing run towards a target it is usually necessary for the pilot to steer his aircraft with great accuracy and precision, usually at an accurately controlled constant altitude, in order that the aim at the target may not be impaired. Again, in carrying out a landing along a radio-defined glide path by observation of indicating means controlled by glide path and instrument signals very great accuracy of control of the aircraft about its pitch axis is required from the pilot to cause the aircraft to follow the landing path within close limits so as to effect a safe landing. On the other hand, during normal cross-country flying the requirements for accuracy of steering are not nearly so stringent since the aircraft may be permitted to deviate quite considerably from its course without any ill effect.

It will be appreciated from the foregoing that it is not necessary, in the case of the pitch-indicating means, for example, for the sensitivity of the pitch-indicating means to be as high during normal cross-country flight as during a glide-path landing. Consequently, if an indicating system is employed in which the indicating means is used to provide an indication measuring deviation of the aircraft in pitch from a computed pitch angle during a glide-path landing and measuring deviation of the aircraft in pitch from a predetermined or set pitch angle during a normal cross-country flight, it is not necessary in the latter case for the instrument to provide an indication as large as that provided in the former case for the same angular deviation in pitch from the zero value in both cases.

If the indicating means is made equally sensitive in both cases it will either be insufficiently sensitive during an airfield approach along a glide path or too sensitive in ordinary cross-country flight or both. In the former case it will become difficult for the pilot to control the aircraft accurately during landing which is a dangerous condition and in the latter case the pilot will tend to become fatigued during a long cross-country flight by attempting to keep the pitch deviation of the aircraft unnecessarily close to the zero by unnecessarily correcting small deviations of the aircraft that are represented as large.

It is accordingly an object of the present feature of the invention to provide, and there is provided by that feature, apparatus for use in aircraft for facilitating the steering of the aircraft comprising indicating means having an indicator arranged to be controlled from a direction-determining means responsive to departure of the aircraft's attitude about an axis from a reference direction which may be a predetermined direction set, or a direction computed with respect to the direction-determining means, characterised in that there is also provided means for adjusting, during flight, the sensitivity with which an indication is produced in response to a given departure of the aircraft's attitude.

This feature of the invention may be applied to that type of indicating apparatus in which an indicating means is arranged to be selectively controlled from two or more sets of control signals, each set comprising a signal derived from a direction-determining device in response to deviation of the aircraft from a selected flight path or reference direction determined in relation to the said direction-determining device, for example, by adjustable setting means, and at least one of the said sets of signals comprising a secondary signal derived from a displacement-responsive device in response to displacement of the aircraft from a predetermined flight path or surface of substantially constant altitude or a radio-defined flight path, the said secondary signal thereby serving to determine a computed altitude, for example, for the aircraft which will be maintained by the pilot if he steers the aircraft to maintain the sum of the primary and secondary signals substantially at zero. When the invention is applied to such apparatus the means for changing over the control of the indicating means from one set of control signals to another automatically renders effective the means for adjusting the sensitivity with which an indication is produced.

The invention is applicable to apparatus in which the resultant signal is used to effect automatic control of the aircraft. The invention is also applicable to apparatus for providing visual indications to the pilot, by means of which manual steering of the aircraft may be effected.

An embodiment of the invention will now be described, by way of example only, with reference to the accompanying drawing which illustrates schematically indicating apparatus incorporating the invention.

As shown in the drawing, the apparatus includes a crossed-pointer meter 1 which is to be used by the pilot of an aircraft to facilitate his steering of the aircraft in cross-country flights, in flying along a localiser path, or in flying down a landing path defined by a localiser path and a glide path. The crossed-pointer meter 1 is selectively controlled by various combinations of signals derived from the various instruments illustrated, viz., gyro-magnetic compass 2, altitude-responsive device 3, glide-path receiver 4, localiser-receiver 5 and a gyro-vertical 62, the pick-off devices 6 and 7 of which are illustrated, according as the aircraft is to be steered in cross-country flight, along a localiser path, or down a landing path. The mode of flight to be steered is selected by the operation by the pilot of various control knobs 8, 9, 10 on a control panel 11.

As will be seen, the crossed-pointer meter 1 comprises a horizontally-movable vertical pointer 12 and a vertically-movable horizontal pointer 13 arranged to move over a common background 14 from a common zero reference position 15 at the centre of the dial. Pointers 12 and 13 are controlled to move over the face of the crossed-pointer meter 1 by driving units 16, 17 which may be of any suitable kind capable of producing movement of a member in response to control signals applied thereto. The pilot controls movements of the aircraft in azimuth by means of the pointer 12 and the attitude of the aircraft in pitch by means of the pointer 13, the system being such that the aircraft is steered so as to maintain the pointers 12, 13 always intersecting at their common zero reference position 15.

The control panel 11 is provided within easy reach of the operator for selection of the desired mode of flight. It comprises a main control knob 8, an altitude control knob 9, and a pitch-setting control knob 10. The main control knob 8 is settable into any one of four positions A, B, C, D, each of which corresponds to a different mode of flight that is to be steered. When the knob 8 is in the position A the mode of flight is to be along a localiser path in one direction and when the knob 8 is in the position C the mode of flight is to be along the localiser path in the opposite direction. When the knob 8 is in the position B the mode of flight is to be cross-country and when the knob 8 is in the position D the mode of flight is to be along a landing path leading to a runway.

The altitude control knob 9 has "on" and "off" positions and by means of an interlock arrangement (not shown) can only be switched to the "on" position when the main knob 8 is in positions A, B and C and, in fact, if the altitude knob is in the "on" position when the main knob 8 is switched to position D, it will automatically be moved to the "off" position. With main knob 8 in one of the positions A, B, C, and the altitude control knob 9 in the "on" position the mode of flight is along a localiser path or cross-country at a constant altitude.

The pitch-setting knob 10 is settable to read against a scale 61 calibrated in degrees, and may be used to set an angle of climb or to set a desired pitch trim in order, for example, to compensate for a change in the load distribution of the aircraft or to compensate for the effect of wind.

The various instruments from which the different signals dependent upon the attitude of the craft and its position with respect to a chosen flight path are derived for operating the pointers 12, 13 are a gyro-magnetic compass 2, an altitude-responsive device 3, a glide path receiver 4, a localiser receiver 5 and a gyro-vertical 62. A suitable mechanical connection 63 is made from the roll axis of gyroscope 62 to roll pick-off 6, and a similar connection 64 is made between the pitch axis of the gyroscope and the wiper arm 28 of pitch pick-off 7 such that the movements of the craft about its roll and pitch axes are mechanically transmitted from the gyroscope to the respective pick-offs in a conventional manner.

The gyro-magnetic compass 2 is of well-known kind. It is provided with means for setting a desired heading to be followed by the aircraft and provides an alternating-current signal along the leads 65 to the azimuth channel 18, which signal is a measure in magnitude and sense of the angular departure of the heading of the aircraft from the preset heading.

The altitude-responsive device 3 is also of well-known kind and comprises a pressure-responsive bellows (not shown) whose shaft positions the armature of a signal generator. The device provides an alternating-current signal along the leads 19 to the elevation channel 20 in dependence on whether a switch 21 is open or closed. The signal is a measure in magnitude and sense of the displacement of the aircraft from a reference altitude.

The glide-path receiver 4 is of well-known form and provides a direct-current signal as a measure in magnitude and polarity of the displacement of the aircraft from a glide-path defined by radio means external to the aircraft situated adjacent a runway at a landing field. This direct-current signal appears in the leads 22 and is supplied to the elevation channel 20 in dependence on the position of the main control knob 8. In the channel 20 it is converted into an alternating current of corresponding magnitude and sense which is fed to form part of a resultant signal.

The localiser receiver 5 is of well-known kind and provides a direct-current signal as a measure, in magnitude and polarity, of the displacement of the aircraft from a localiser path defined by radio means external to the aircraft situated adjacent a runway at a landing field. This direct-current appears in the leads 23 and is supplied to the azimuth channel 20 in dependence on the position of the main control knob 8. In the channel 20 the direct-current signal is converted into an alternating current of corresponding magnitude and sense, which is fed to form part of a resultant signal.

The gyro-vertical is of well-known kind. Roll pick-off device 6 provides an alternating-current signal along the leads 24 which is a measure, in magnitude and sense, of the bank angle of the aircraft. This signal is supplied to the azimuth channel 18. Pitch pick-off device 7 is associated with a pitch-setting device 25 controlled from the pitch-setting control knob 10 and the combination provides an alternating-current signal along the leads 26 which is a measure, in magnitude and sense, of the angular departure of the aircraft in pitch from the preset pitch. This signal is supplied to the elevation channel 20.

The pitch pick-off device 7 comprises a potentiometer 27 whose wiper arm 28 is controlled by the relative angular movement in pitch of the aircraft and a sensitive part of the gyro-vertical. The pitch-setting device 25 comprises a potentiometer 29, whose wiper arm 30 is attached to a drum 32 which is adjustably positioned by the knob 10 through a mechanical connection, shown as the dotted line 31. The drum 32 is provided with an electro-magnetically operated clutch shown in the form of a brake-block 33 connected by means of a pivoted arm 34 to the armature of an electro-magnet 35. The winding of the electro-magnet 35 and the winding of an electro-magnet 36 connected to operate the switch 21 are connected through the on-off switch 37 and one pole K of a five-pole position switch E, F, G, H, K, to the source of direct current 38. The on-off switch 37 is operated by the altitude on-off control knob 9 through a mechanical connection shown as the dotted line 39, and it will be seen that the connections to the switch 37 from the electro-magnets 35, 36 are such that the electro-magnet 36 is energised only when the altitude control knob is in the "on" position, whereas the electro-magnet 35 is energised when the altitude control knob is in the "on" or the "off" position. When the electro-magnet 36 is energised the switch 21 is closed, and when it is de-energised the switch 21 is opened by a spring 40. In the closed position of the switch the altitude-responsive device is connected in circuit to the elevation channel.

When the switch 37 is being switched by the altitude control knob 9 from the "on" to the "off" position or from the "off" position to the "on" position, the electro-magnet 35 is de-energised so that the clutch 33, 34 is ineffective to withstand the pressure exerted by the springs 41, 42 connecting the wiper arm 30 to base, and the springs, therefore, serve to centralise the wiper arm to its central position with respect to the potentiometer 29. When the electro-magnet 35 is energised the clutch 33, 34 is effective to hold the drum 32 and wiper arm 30 against the action of the springs 41, 42 in any position set by the pitch-setting knob 10.

The potentiometer 29 is connected in a bridge circuit with potentiometer 27 of the pitch pick-off device of the gyro-vertical. One diagonal of the bridge is energised from the alternating-current source 43 and the other diagonal provides the output signal along leads 26 measuring the angular departure in pitch of the aircraft from the preset pitch. If the aircraft is flying level, with no preset pitch, the wiper arms 28, 30 will be in their central positions and no output signal will be supplied along leads 26. If the aircraft deviates from this position by pitching or climbing the wiper arm 28 will be moved relative to the potentiometer 27 so that the bridge circuit will be unbalanced and an output signal provided in the leads 26. This signal is supplied through the elevation channel 20 to move the pointer 13 to call for a correcting movement of the aircraft by the pilot. The bridge may also be unbalanced by manual operation of the control knob 10 by the pilot so as to move the pointer arm 30 over the potentiometer 29 so as to set a desired trim or climb or dive of the aircraft.

The main control knob 8, as has been stated, may be positioned in any one of four positions A, B, C, D. It operates through a mechanical connection, shown as the dotted line 44, a five-pole 4 position switch having banks of contacts designated as E, F, G, H, K. The banks of contacts have the fixed contacts $E_1$, $E_2$, $E_3$, $E_4$; $F_1$, $F_2$, $F_3$, $F_4$; $G_1$, $G_2$, $G_3$, $G_4$; $H_1$, $H_2$, $H_3$, $H_4$ and $K_1$, $K_2$, $K_3$, $K_4$ respectively and movable contacts arms $E_5$, $F_5$, $G_5$, $H_5$, $K_5$ respectively. As has also been stated, the position that the knob 8 is to occupy is determined by the pilot according to the mode of flight that he wishes the aircraft to undertake. As is shown, the signals from the gyro-magnetic compass 2, the roll pick-off device 6 and pitch pick-off device 27 are always in circuit when the system is in use.

The banks of contacts E, F, G, are for enabling the glide-path receiver and the localiser receiver to be connected, in or out of circuit, to the crossed-pointed meter 1, or to dummy loads 55, 56. The bank H is for enabling a sensitivity-varying device (to be described later) to be brought into operation, and the bank K is for enabling the electro-magnets 35, 36 to be energised from the direct current source 38 when the knob 8 is in certain positions.

The azimuth channel 18 and the elevation channel 20 each comprises various devices, such as amplifiers, signal modifiers, limiters and combiners for combining various signals supplied to it; and, consequently, may be termed azimuth signal summation means and elevation signal summation means, respectively. A suitable arrangement of amplifiers, signal modifiers, limiters and combiners for the respective summation means is described in considerable detail in U. S. Patent 2,613,352 issued October 7, 1952, in the name of S. Kellogg, 2nd.

The various modes of flight possible by using the apparatus will now be described:

*Flight along a localiser path in one direction*

The knob 8 is turned to position A so that the contact arms $E_5$, $F_5$, $G_5$, $H_5$, $K_5$ are moved to the contacts $E_1$, $F_1$, $G_1$, $H_1$, $K_1$, respectively. The altitude control knob 9 is in the "off" position. The localiser receiver 5 is connected in circuit to the azimuth channel through leads 23, contacts arms $E_5$, $F_5$, contacts $E_1$, $F_1$ and leads 53. In the azimuth channel 18, the localiser receiver signal is combined with signals from the gyro-magnetic compass 2 and the gyro-vertical roll pick-off device 6 and the output from the azimuth signal summation means or channel 18 is supplied along leads 51 to operate the pointer 12. The glide path receiver 4 is connected to the dummy load 56 through leads 22, contact arm $G_5$ and contact $G_1$. The altitude-responsive device 3 is disconnected since the spring 40 opens the switch 21 due to the solenoid 36 being unenergized. The elevation signal summation means or channel 20 is, therefore, only supplied with the signal from the unbalance of the bridge circuit including the gyro-vertical pitch pick-off potentiometer 27 and the pitch-setting potentiometer 29. The output from the elevation channel 20 is fed to operate the pointer 13.

If the aircraft is steered so as to maintain the pointers 12 and 13 at their zero reference position the aircraft will fly level along the localiser path or if it has become displaced therefrom it will approach the localiser path substantially asymptotically.

If desired, the pitch-setting knob 10 may be set to a desired trim that it is required that the aircraft should assume. This will take effect by a movement of the arm 30 over the potentiometer 29 to unbalance the bridge circuit and supply a biasing signal along the leads 26 to the elevation channel.

*Flight along the localiser path in the opposite direction*

The knob 8 is turned to position C so that the contact arms E5, F5, G5, H5, K5, are moved to the contacts E3, F3, G3, H3, K3, respectively. The altitude control knob is in the "off" position. The localiser receiver 5 is connected to the azimuth channel 18 through leads 23, contact arms E5, F5, contacts E3, F3 and leads 53. In the azimuth channel 18 the localiser receiver signal, which in this case is in the opposite sense to the localiser signal referred to in the preceding mode of flight, is combined with signals from the gyro-magnetic compass 2 and the roll pick-off device 6, and the output from the azimuth channel 18 is fed along leads 51 to operate the pointer 12. In this case, again, the glide path receiver 4 is connectd to the dummy load 56 through leads 22, contact arm G5 and contact G3. The altitude-responsive device is also disconnectd from the circuit by the contact 21, so that the elevation channel is only supplied with the signal from the unbalance of the bridge formed by the potentiometers 27 and 29. If the aircraft is steered so as to maintain the pointers 12 and 13 at their zero reference position the aircraft will fly level along the localiser path in the opposite direction from that referred to in the preceding mode of flight, or if it becomes displaced therefrom, it will approach it substantially asymptotically. Again, the pitch-trim knob may be operated to set a desired trim that it is required that the aircraft should assume.

In either of the two modes of flight referred to above the altitude-control knob may be switched on if it is desired that the aircraft should fly also at a constant altitude. In that case the switch 37 will be turned to the "on" position so that the electro-magnet 36 is energized from the source 38 through contact arm K5 and contact K2 so as to close the contact 21 against the action of spring 40. The altitude-responsive device 3 will then be connected in circuit to the elevation channel, where the signal received from it will be combined with the signal from the bridge formed by potentiometers 27 and 29. The pointer 13 will thus be operated from the combined pitch and altitude signals so that in that mode of flight the aircraft will fly level along the localiser path in one direction or the other at a constant altitude, or if it has departed from the predetermined altitude it will be steered asymptotically to approach that altitude.

When the altitude control knob 9 is switched from the "off" to the "on" position the electro-magnet 35 will be temporarily disconnected from the source 38 by the on-off switch 37 so that the brake 33, 34 is released and the springs 30 will centralise the arm 30 if a trim of the aircraft has previously been set. However, since the altitude-control knob is in the "on" position the electro-magnet 35 will again be energised and the clutch 33, 34 rendered effective, so that the wiper arm 30 may again be adjusted by the pitch control knob 10 to set a desired trim.

*Cross-country flight*

The main control knob 8 is turned to position B, as shown in the drawing, so that the contact arms E5, F5, G5, H5, K5 are moved to the contacts E2, F2, G2, H2, K2, in which positions they serve to connect the glide path receiver 4 and the localiser receiver 5 to the dummy loads 55, 56 respectively.

The altitude control knob 9 is in the "off" position so that the contact 21 is opened and the altitude-responsive device is disconnected from the circuit. The azimuth channel 18 will, therefore, only be supplied with the signals from the gyro-magnetic compass 2 and the gyro-vertical roll pick-off device 6, and the elevation channel will only be supplied with the signal from the pitch bridge circuit formed of potentiometers 27 and 29. If the aircraft is steered so as to maintain the pointers 12 and 13 at their zero reference position the aircraft will fly level at the predetermined heading set on the gyro-magnetic compass, or if it departs from this predetermined heading it will approach that heading asymptotically.

*Cross-country flight at constant altitude*

The operation in this case is similar to the preceding mode of flight, except that the altitude control knob 9 is switched to the "on" position so as to close the contact 21 and connect the altitude-responsive device in circuit to the elevation channel. The horizontal pointer 13 will then be controlled from the combination of the signals received from the altitude responsive device 3 and the bridge circuit 27, 29.

Again, in either of the preceding modes of flight the pitch-trim knob 10 may be set to a desired trim that it is required that the aircraft should assume.

In all the preceding modes of flight, whenever the altitude control knob is switched from the "off" position to the "on" position or from the "on" position to the "off" position the pitch-trim wiper 30 is spring-centralised, as also is the pitch-trim knob 10, by the mechanical action of the drum 32, but it is left free to be set again to any desired position.

*Flight along a landing beam defined by a localiser path and a glide path*

The control knob 8 is turned to position D so that the contact arms E5, F5, G5, H5, K5 are moved to the contacts E4, F4, G4, H4, K4. The altitude control knob is, by means of an interlock arrangement (not shown) turned to the "off" position, unless it is already there, and locked in that position until the knob 8 is again moved to some other position. Thus, with the knob 8 in position D, the altitude-responsive device is permanently disconnected from the circuit to the elevation channel. The glide-path receiver and the localiser receiver are connected to the elevation channel and the azimuth channel respectively to leads 22, 23, contact arms G5, E5, contacts G4, E4 and leads 54, 53.

When the pointer 8 is in the position D a pitch biassing signal is automatically introduced in the elevation channel by means not shown, this pitch biassing signal being of an amount sufficient to cause the aircraft, when controlled in accordance with the system, to adopt a predetermined attitude in pitch corresponding to the slope of the glide path. The pointer 12 will thus be controlled from the combination of signals derived from the localiser receiver 5, gyro-magnetic compass 2 and the gyro-vertical roll pick-off device 6, and the pointer 13 will be controlled from the combination of signals derived from the glide path receiver 4, the pitch bridge circuit 27, 29 and the pitch biassing signal. Thus, when the aircraft is steered so as to maintain the pointers 12 and 13 at their zero reference position the aircraft will fly down the landing path at a predetermined pitch angle, or if it departs from the landing path it will approach it asymptotically.

During this mode of flight, with apparatus in accordance with the present embodiment, the pitch-setting device is rendered ineffective by disconnecting the source of energy 38 from the electro-magnet 35 by means of the contact arm K5 and the contact K4. The wiper arm 30 will, therefore, during this mode of flight always be at its central position with respect to the potentiometer 29. However, if desired, the pitch-setting device may be left effective by connecting the contact K4 to the lead that connects the contacts K1, K2, K3, in which case the pilot is enabled to vary the effect of the pitch bias.

In any one of the above referred to modes of flight, with the exception of the mode of flight involving steering the aircraft along the landing path and thus involving the maintenance of the aircraft at a constant altitude, the pitch setting means may be utilised to set a desired angle of climb or dive of the aircraft. This is done by setting the knob 10 to the desired angle with reference to the scale 61, which movement turns the drum 32 through the mechanical connection 31 and with it the wiper arm 30. This produces a biassing signal along the leads 26 to the elevation channel and thereby to the pointer 13. The pilot of the aircraft changes the attitude of the aircraft until the pointer registers zero and by steering his aircraft so as to maintain it there the aircraft will climb or dive at the angle set.

It is not necessary for the sensitivity of the respective systems feeding azimuth and elevation control signals to indicating means 1 to be as high during cross-country flight as during flight along a radio-defined glide path. Hence, the output obtained, for example, from the combination of given heading, roll, and localizer inputs for controlling the vertical bar of indicator 1 preferably should be varied by some suitable sensitivity control means so as to increase such output when on glide path over whatever output that would normally be obtained from these inputs when not on glide path. Similarly, the outputs obtainable from other combinations of given inputs for controlling indicator 1 preferably should be varied from one value to a higher value, again by sensitivity control means responsive to the connection of glide path data to the present apparatus. One suitable means for controlling the sensitivity of the azimuth and elevation systems comprises a device by which the sensitivity of the indicator may be changed depending on whether or not the apparatus is being used for landing on glide path. The device of this nature preferably employed in the present apparatus includes the resistances 45 and 46 which, by means of the electromagnetically operated switches 48, 49, may be shunted across the leads 51, 52 when it is desired to reduce the sensitivity of the crossed-pointer meter 1.

In the present embodiment the sensitivity-changing device is rendered operative when the control knob 8 is turned to any one of positions A, B, and C. In these positions the contact arm $H_5$ will be in contact with one of the contacts $H_1$, $H_2$ or $H_3$ and the electro-magnet 50 will be energised from the source 38 to close the contacts 48, 49 against the spring 47. This results in the resistances 45 and 46 being shunted across the leads 51, 52 and thus reduce the response of the pointers 12 and 13.

When the control knob 8 is turned to the position D, that is, during a landing path maneuver, the contact arm $H_5$ is turned so as to come into contact with the contact $H_4$ and thus disconnect the electro-magnet 50 from the source 38. The spring 47 will then open the contacts 48 and 49 and allow the full flow of power to operate the pointers 12 and 13 and thus increase the sensitivity of the crossed-pointer meter 1. If desired, the contacts $H_3$, $H_1$, may be disconnected from the contact $H_2$, so that the electro-magnet 50 would only be energised when the control knob 8 is in the position B, that is, during cross-country flight without radio signals. If desired, also, it may be arranged that the electro-magnet 50 is de-energised when the altitude control knob 9 is switched on, so that maximum sensitivity is provided when the aircraft is being maintained at constant altitude.

What is claimed is:

1. In a navigational aid for a dirigible craft, a system comprising elevation signal summation means including an amplifier capable of providing a control signal in proportion to the algebraic sum of a plurality of input signals thereto, glide path receiver means for supplying a signal that varies in accordance with the displacement of the craft vertically of a radio-defined glide path, means operable to connect the glide path signal in input fashion to said elevation signal summation means, sensitivity control means operable to increase the sensitivity of the system by a fixed amount, and signal-selecting means adapted to effect a substantially simultaneous operation of said last recited means with said glide path signal connecting means.

2. In a navigational aid for a dirigible craft, the combination comprising elevation signal summation means including an amplifier capable of providing a control signal in proportion to the algebraic sum of a plurality of input signals thereto, fixed impedance means normally connected across the output of said elevation signal summation means, glide path receiver means for supplying a signal that varies in accordance with the displacement of the craft vertically of a radio-defined glide path, means operable to connect the glide path signal in input fashion to said elevation signal summation means, means for disconnecting said fixed impedance means from the normal connection thereof, and signal-selecting means adapted to effect a substantially simultaneous operation of said last recited means with said glide path signal connecting means thereby to increase the sensitivity of the navigational aid a fixed amount substantially simultaneously with the connection of the glide path signal as an input to the elevation signal summation means.

3. In a navigational aid for a dirigible craft, a system comprising elevation signal summation means including an amplifier capable of providing a control signal in proportion to the algebraic sum of a plurality of input signals thereto, attitude responsive means comprising a vertical gyroscope for producing a signal that varies in accordance with the departure of the craft from a reference pitch attitude, means connecting the pitch attitude departure signal in input fashion to said elevation signal summation means, glide path receiver means for supplying a signal that varies in accordance with the displacement of the craft vertically of a radio-defined glide path, means operable to connect the glide path signal in input fashion to said elevation signal summation means, sensitivity control means operable to increase the sensitivity of the system by a fixed amount, and signal-selecting means adapted to effect a substantially simultaneous operation of said last recited means with said glide path signal connecting means.

4. In a navigational aid for a dirigible craft, a first system comprising azimuth signal summation means including an amplifier capable of providing a first control signal in proportion to the algebraic sum of a plurality of input signals thereto, a second system comprising elevation signal summation means including an amplifier capable of providing a second control signal in proportion to the algebraic sum of a plurality of input signals thereto, glide path receiver means for supplying a signal that varies in accordance with the displacement of the craft vertically of a radio-defined glide path, means operable to connect the glide path signal in input fashion to said elevation signal summation means, sensitivity control means operable to increase the sensitivity of said first system by a fixed amount, and means for effecting a substantially simultaneous operation of said last recited means with said glide path signal connecting means such that the magnitude of said first control signal is increased from one value to a higher value for a given algebraic sum of its input signal components when the glide path signal is connected as an input to said elevation signal summation means.

5. In a navigational aid for a dirigible craft, the combination comprising azimuth signal summation means including a first amplifier capable of providing a first control signal in proportion to the algebraic sum of a plurality of input signals thereto, fixed impedance means normally connected to attenuate the output of said azimuth signal summation means, elevation signal summation means including a second amplifier capable of providing a second control signal in proportion to the algebraic sum of a plurality of input signals thereto, glide path receiver means for supplying a signal that varies in accordance with the displacement of the craft vertically of a radio-defined glide path, means operable to connect the glide path signal in input fashion to said elevation signal summation means, means for opening the connection of said fixed impedance, and means for effecting a substantially simultaneous operation of said last recited means with said glide path signal connecting means thereby to increase the magnitude of said first control signal from one value to a higher value for a given algebraic sum of its input signal components when the glide path signal is connected as an input to said elevation signal summation means.

6. In a navigational aid for a dirigible craft, a first system comprising azimuth signal summation means including an amplifier capable of providing a first control signal in proportion to the algebraic sum of a plurality of input signals thereto, a second system comprising elevation signal summation means including a second amplifier capable of providing a second control signal in proportion to the algebraic sum of a plurality of input signals thereto, glide path receiver means for supplying a signal that varies in accordance with the displacement of the craft vertically of a radio-defined glide path, means operable to connect the glide path signal in input fashion to said elevation signal summation means, sensitivity control means operable to increase the sensitivity of said first and second systems by fixed respective amounts, and means for effecting a substantially simultaneous operation of said last recited means with said glide path signal connecting means.

7. In a navigational aid for a dirigible craft, a first system comprising azimuth signal summation means including a first amplifier capable of providing a first control signal in proportion to the algebraic sum of a plurality of input signals thereto, a direction-determining device for producing a signal that varies in accordance with the departure of the craft from a reference heading, means connecting the heading departure signal in input fashion to said azimuth signal summation means, localizer receiver means for supplying a signal that varies in accordance with the displacement of the craft laterally of a localizer path, and means operable to connect the localizer signal in input fashion to said azimuth signal summation means, a second system comprising elevation signal summation means including an amplifier capable of providing a second control signal in proportion to the algebraic sum of a plurality of input signals thereto, glide path receiver means for supplying a signal that varies in accordance with the displacement of the craft vertically of a radio-defined glide path, means operable to connect the glide path signal in input fashion to said elevation signal summation means, sensitivity control means operable to increase the sensitivity of said first system by a fixed amount, and means for effecting a substantially simultaneous operation of said last recited means with said glide path signal connecting means such that the magnitude of said first control signal is increased from one value to a higher value for given inputs of heading departure and localizer displacement signals when the glide path signal is connected as an input to said elevation signal summation means.

8. The combination recited in claim 7 further comprising means including a vertical gyroscope for producing a signal that varies in accordance with departures of the craft from a reference roll attitude, and means for connecting the roll attitude departure signal in input fashion to the azimuth signal summation means.

9. The combination recited in claim 8 wherein the sensitivities of both the first and second systems are increased fixed respective amounts by the operation of the sensitivity control means.

10. In a navigational aid for a dirigible craft, a first system comprising azimuth signal summation means including an amplifier capable of providing a first control signal in proportion to the algebraic sum of a plurality of input signals thereto, a direction-determining device for producing a signal that varies in accordance with the departure of the craft from a reference heading, means connecting the heading departure signal in input fashion to said azimuth signal summation means, localizer receiver means for supplying a signal that varies in accordance with the displacement of the craft laterally of a localizer path, and means operable to connect the localizer signal in input fashion to said azimuth signal summation means, a second system comprising elevation signal summation means including an amplifier capable of providing a second control signal in proportion to the algebraic sum of a plurality of input signals thereto, attitude responsive means comprising a vertical gyroscope for producing a signal that varies in accordance with the departure of the craft from a reference pitch attitude, means connecting the pitch attitude departure signal in input fashion to said elevation signal summation means, glide path receiver means for supplying a signal that varies in accordance with the displacement of the craft vertically of a radio-defined glide path, means operable to connect the glide path signal in input fashion to said elevation signal summation means, sensitivity control means operable to increase the sensitivity of at least one of said systems by a fixed amount, and means for effecting a substantially simultaneous operation of said last recited means with said glide path signal connecting means such that the magnitude of at least one of said control signals is changed from one value to a higher value for a given set of its input signal components when the glide path signal is connected as an input to said elevation signal summation means.

11. The combination recited in claim 10 wherein the sensitivities of both the first and second systems are increased fixed respective amounts by the operation of the sensitivity control means.

12. In a navigational aid for dirigible craft, the combination comprising first and second data systems each including a plurality of signal producing means for supplying signals dependent upon the attitude of a craft and its position with respect to a chosen flight path, a glide path receiver, switch means for connecting and disconnecting said receiver in input fashion to said first data system, at least one of said data systems including means for changing its own sensitivity by a fixed amount and means for operating said sensitivity changing means substantially simultaneously with an operation of said switch means.

13. In a navigational aid for dirigible craft, the combination comprising elevational signal summation means including an amplifier capable of providing a control signal in proportion to the algebraic sum of a plurality of input signals thereto, a vertical gyroscope, signal generating means cooperating with said vertical gyroscope for producing a signal in accordance with departures of the craft from a reference pitch attitude, said signal generating means including manually settable means for varying said pitch reference attitude about a given setting thereof, means connecting the pitch attitude departure signal in input fashion to said elevation signal summation means, altitude responsive means for providing a signal in accordance with departures of the craft from a reference altitude, means operable to connect the altitude signal in input fashion to said elevation signal summation means, reference pitch attitude resetting means including spring means connected to said manually settable means and adapted to exert tension thereon for settings other than said given setting, means capable of holding the manually settable means against the tension of said spring means, means for releasing the manually settable means from the hold of said holding means, and means for effecting a substantially simultaneous operation of said last-recited means with the altitude signal connecting means, thereby to restore the manually settable means through said spring means to said given setting.

(References on following page)

References Cited in the file of this patent

UNITED STATES PATENTS

| | | |
|---|---|---|
| 1,999,047 | Hahnemann | Apr. 23, 1935 |
| 2,309,314 | Harshaw | Jan. 26, 1943 |
| 2,395,854 | Ferrill | Mar. 5, 1946 |
| 2,439,044 | Ferrill | Apr. 6, 1948 |
| 2,502,721 | Halpert | Apr. 4, 1950 |
| 2,548,278 | Wirkler | Apr. 10, 1951 |
| 2,567,922 | Brannin et al. | Sept. 18, 1951 |
| 2,592,173 | Noxon et al. | Apr. 8, 1952 |
| 2,613,350 | Kellogg | Oct. 7, 1952 |
| 2,613,352 | Kellogg | Oct. 7, 1952 |

UNITED STATES PATENT OFFICE
CERTIFICATE

Patent No. 2,736,893            Patented February 28, 1956

GERT SYDNEY ZOEGE VON MANTEUFFEL
and
COLIN ARTHUR RICHARDSON

Application having been made jointly by Gert Sydney Zoege Von Manteuffel, Colin Arthur Richardson, the inventors named in the patent above identified, and The Sperry Gyroscope Company, Limited, of Brentford, England, a British company, the assignee, for the issuance of a certificate under the provisions of Title 35, Section 256 of the United States Code, deleting the name of the said Gert Sydney Zoege Von Manteuffel from the patent as a joint inventor, and a showing and proof of facts satisfying the requirements of the said section having been submitted, it is this 18th day of June, 1957, certified that the name of the said Gert Sydney Zoege Von Manteuffel is hereby deleted from the said patent as a joint inventor with the said Colin Arthur Richardson.

[SEAL]

ARTHUR W. CROCKER,
*First Assistant Commissioner of Patents.*